Patented Nov. 10, 1953

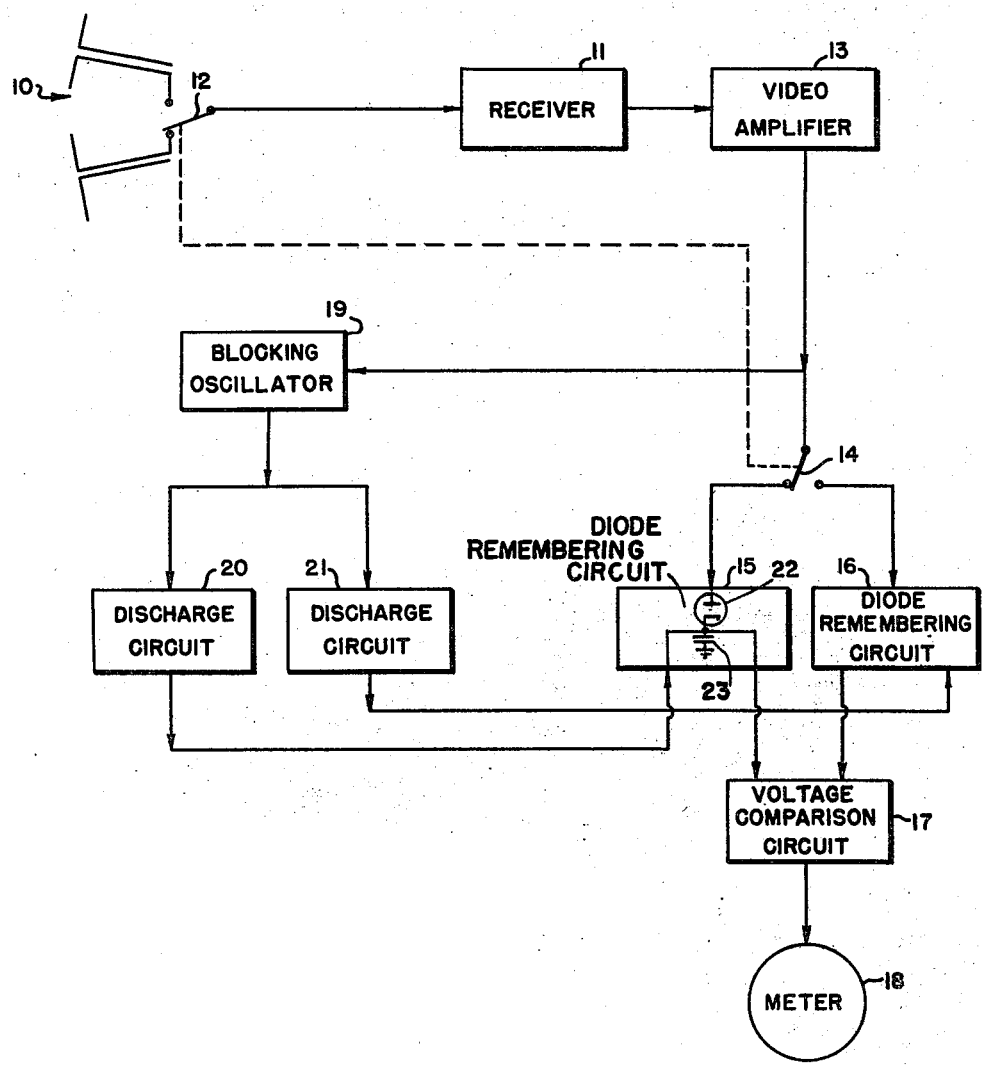

2,659,082

UNITED STATES PATENT OFFICE 2,659,082

RADIO DIRECTION FINDER

Paul A. Pearson, Seattle, Wash., assignor to United States of America as represented by the Secretary of War Application April 30, 1946, Serial No. 665,989

1 Claim. (Cl. 343—120)

This invention relates generally to electrical apparatus and more particularly to a direction indicating system.

Some previous direction indicators actuated by the reception of radio frequency pulsed signals employed a cathode ray tube or rotating antennas, or a combination of both. The use of either is undesirable especially when these devices are used in aircraft. Regardless of where used, a cathode ray tube has such disadvantages as fragility and the requirement of high voltages. In any type of installation a fixed antenna is less subject to mechanical and electrical difficulties than a rotating antenna. Selsyns, synchronous motors or other similar devices with their attendant angular lag, hunting for synchronism and mechanical load resonances are usually required as auxiliary equipment for rotatable antennas.

Previous direction indicating systems have also utilized rotatable loop antennas in conjunction with an indicating meter for determining the antenna pattern null positions; such systems also have some of the disadvantages already mentioned.

It is an object of the present invention to provide a direction indicating system without the use of cathode ray tubes or rotating antennas.

It is also an object to provide a direction indicating system which will operate on either continuous wave signals or pulsed signals.

It is another object to provide a simple lightweight direction indicating system utilizing an indicating meter, particularly adapted for use in aircraft, for continuously indicating the direction of a received signal relative to the heading of the aircraft.

In general a direction indicating system which will accomplish the above mentioned objects comprises a lobe switching antenna, a receiver, charging circuits, discharge circuits, and an indicating meter.

More specifically, a lobe switching antenna having its main axis in line with the airplane axis, receives a signal which is amplified by a radio frequency amplifier and a video amplifier. Video signals are then alternately fed to two identical diode remembering circuits whose output voltages are received by a voltage comparison circuit. The voltage difference of these two signals fed to the voltage comparison circuit operates an indicating meter to show the airplane heading with respect to the bearing of a received signal.

A control circuit comprising a blocking oscillator and two identical discharge circuits is provided for discharging the two previously mentioned diode remembering circuits.

Other objects, features and advantages of this invention will suggest themselves to those skilled in the art and will become apparent from the following description of the invention taken in connection with the accompanying drawing which is a block diagram of an apparatus embodying the principles of this invention.

Referring now to the single figure of the drawing, a lobe switching antenna 10, aligned along the axis of the aircraft, alternately passes signals from its two lobe elements to receiver 11. Lobe switch 12 alternately connects the two lobe elements of antenna 10 to receiver 11 at a rate of a few hundred cycles per second. Received signals are further amplified in a video amplifier 13 and are then fed through a second lobe switch 14 to two identical circuits 15 and 16. Lobe switches 12 and 14 operate in synchronism such that diode remembering circuit 15 operates on signals received by one section of lobe antenna 10, and diode remembering circuit 16 operates on signals received by the other section of lobe antenna 10. A voltage comparison circuit receives the two output voltages of circuits 15 and 16 and the voltage difference, if any, of these two outputs is applied to an indicating meter 18.

A control circuit consisting of a blocking oscillator 19 and two identical discharge circuits 20 and 21 is also actuated by video signals from video amplifier 13. Circuits 20 and 21 provide voltages for discharging circuit elements of diode remembering circuits 15 and 16, respectively.

The principle of operation of this system depends upon the relative magnitude of signals received by the two lobes of antenna 10. When a signal is received from a transmitter straight ahead of the airplane, signals of equal amplitude are received by the two lobes of antenna 10; a comparison of the energy content of the two signals results in a difference energy of zero, and the pointer of indicating meter 18 remains centered. However, if a signal is received from a transmitter which is not in line with the aircraft heading, one lobe of antenna 10 receives a signal larger or smaller than that intercepted by the other lobe. After amplification and comparison, the output of voltage comparison circuit 17 consists of a voltage whose magnitude is proportional to the difference in the energy content of the two received signals, and the pointer of indicating meter 18 moves to the right or left depending on the position of the signal transmitter relative to the airplane heading.

Antenna 10, receiver 11, video amplifier 13 and blocking oscillator 19 are of conventional design. Diode remembering circuits 15 and 16 each consists of a diode tube 22 and a storage condenser 23 which charges to a value approximately equal to the peak value of the video signal voltage each time lobe switch 14 connects circuit 15 or 16 to video amplifier 13. In order that meter 18 will give a correct indication of aircraft orientation even though a signal is not continuously present as would be the case when intermittent signals are being received, the storage condensers in circuits 15 and 16 are not shunted by resistors. Normally these condensers have no path through which to discharge; therefore, they remain charged to substantially the value at which the last signal had charged them, and the indicator of meter 18 remains at the position determined by the charge on the condensers. Thus a "remembering" characteristic is present in circuits 15 and 16.

In order that the storage condensers of circuits 15 and 16 may be charged up to a new value, they are quickly discharged by the operation of circuits 19, 20 and 21. Each time a new burst of video signal is applied to blocking oscillator 18, discharge circuits 20 and 21 are triggered and provide discharge paths for the storage condensers in circuits 15 and 16. These storage condensers are then ready to receive new values of charge supplied by the remainder of the burst of signal. Discharge circuits 20 and 21 each comprises a signal controlled switch of any conventional type which, on operation, short circuits condenser 23 of the diode remembering circuits. An example of a switch of this type which may be used is in Robins Patent No. 2,284,101.

The novel features of the apparatus shown in the drawing relate to the operation of blocking oscillator 19, discharge circuits 20 and 21 and diode remembering circuits 15 and 16.

When the direction finding system receives intermittent signals, these circuits enable meter 18 to give a continuous reading, corrected upon the reception of each new burst of signals.

To illustrate the operation of these discharge circuits, remembering circuits and oscillator circuits, a specific application of a device embodying the principles of this invention will be given.

Suppose a direction finding system as herein disclosed, received signals from a pulsed radio frequency transmitter which employed a directional antenna which rotated in azimuth. Each time the azimuth sweeping, transmitter antenna pointed toward the direction finding system, a burst of signals would be received by the direction finding system. Upon the reception of the first pulse of this burst of signals, blocking oscillator 19 would trigger the discharge circuits 20 and 21, and diode remembering circuits 15 and 16 would be discharged. During the remainder of the time in which the transmitter antenna was pointed in the general direction of the direction finding system, the act of lobe switching in the direction finding system would occur several times and each of diode remembering circuits 15 and 16 would acquire a new value of electrical charge. The time constant of these remembering circuits is sufficiently large so that meter 18 would retain its indication until the transmitter antenna had rotated through approximately 360 degrees in azimuth and again pointed in the general direction of the direction finding system. At this time, a new burst of signals would be received by the direction finding system, and blocking oscillator 19 would trigger discharge circuits 20 and 21, which in turn, would discharge diode remembering circuits 15 and 16. Circuits 15 and 16 then again acquire new values of electrical charge.

Blocking oscillator 19 has a long time constant, of the order of seconds rather than microseconds. Consequently oscillator 19 is not triggered by each individual pulse when pulsed signals are being received.

Diode remembering circuits 15 and 16 also have very long time constants and retain their values of charge until discharged by the action of oscillator 19 and discharge circuits 20 and 21.

While there has been here described what is at present considered to be the preformed embodiment of the invention, it will be obvious to those skilled in the art that various changes and modifications may be made therein without departing from the scope of the invention.

What is claimed is:

A reception system for indicating the direction of intermittent bursts of radio-frequency signals, said system comprising a lobe switching antenna having first switching means for shifting the lobe thereof between two predetermined angular positions at a rate such that said lobe is shifted a plurality of times in the interval of a burst, a receiver having its input coupled to said antenna, first and second remembering circuits each of which derives a steady direct current voltage having a magnitude proportional to the peak amplitude of an intermittent signal applied thereto, second switching means synchronized with said first switching means for selectively applying the output of said receiver to said respective first and second remembering circuits, indicator means coupled to both said first and second remembering circuits for indicating the difference between the magnitudes of the direct current voltages from said first and second remembering circuits, and discharging means coupled between said receiver and said first and second remembering circuits for dissipating the direct current voltages of both said first and second remembering circuits in response to the initiation of a received burst of signal, whereby said indicator means continuously provides an indication of the bearing of each successive burst of radio-frequency signal.

PAUL A. PEARSON.

References Cited in the file of this patent

UNITED STATES PATENTS

| Number | Name | Date |
|---|---|---|
| 2,176,469 | Moueix | Oct. 17, 1939 |
| 2,189,549 | Hershberger | Feb. 6, 1940 |
| 2,266,038 | Hinman | Dec. 16, 1941 |
| 2,392,420 | Steinhoff | Jan. 8, 1946 |
| 2,405,930 | Goldberg | Aug. 13, 1946 |
| 2,415,566 | Rhea | Feb. 11, 1947 |
| 2,418,143 | Stodola | Apr. 1, 1947 |
| 2,422,072 | Blodgett | June 10, 1947 |
| 2,449,517 | Stout et al. | Sept. 14, 1948 |
| 2,539,402 | Clark | Jan. 30, 1951 |